United States Patent [19]

Yasutome

[11] Patent Number: 5,119,717
[45] Date of Patent: Jun. 9, 1992

[54] METHOD OF CONTROLLING SOLENOID VALVES FOR A HYDRAULIC ACTUATOR, WITH A TIME DELAY BETWEEN CLOSING A NORMALLY OPEN VALVE AND OPENING A NORMALLY CLOSED VALVE

[75] Inventor: Seiichi Yasutome, Saitama, Japan

[73] Assignee: ZEXEL Corporation, Tokyo, Japan

[21] Appl. No.: 579,880

[22] Filed: Sep. 7, 1990

[30] Foreign Application Priority Data

Sep. 11, 1989 [JP] Japan ............................ 1-232915

[51] Int. Cl.$^5$ .................................... F15B 13/16
[52] U.S. Cl. .................................... 91/361; 91/459
[58] Field of Search ............... 91/35, 361, 363 R, 393, 91/454, 459, DIG. 1; 74/335

[56] References Cited

U.S. PATENT DOCUMENTS

| | | | |
|---|---|---|---|
| 3,744,374 | 7/1973 | Schneider et al. | 91/363 R |
| 3,768,375 | 10/1973 | Flaschar et al. | 91/459 |
| 3,831,495 | 8/1974 | Arnold et al. | 91/459 |
| 3,964,260 | 6/1976 | Williams et al. | 60/418 |
| 4,587,883 | 5/1986 | Ehrentraut et al. | 91/361 |
| 4,595,979 | 6/1986 | Arai et al. | 91/361 |
| 4,813,335 | 3/1989 | Wakiya et al. | 91/361 |
| 4,896,553 | 1/1990 | Sato et al. | 74/335 |

Primary Examiner—Edward K. Look
Assistant Examiner—F. Daniel Lopez
Attorney, Agent, or Firm—Nields & Lemack

[57] ABSTRACT

There is disclosed a method of controlling a hydraulic actuator by using a normally closed solenoid valve and two normally open solenoid valves and selectively actuating them to place the piston of a hydraulic cylinder in position. The normally closed valve is installed in the fluid passage connecting a hydraulic pressure generator with the hydraulic cylinder and on the side of the generator. The normally open valves are connected in series downstream of the normally closed valve. At the beginning of the operation of the cylinder, the normally closed valve is opened after a lapse of a waiting time long enough for that of the normally open valves which corresponds to the direction of movement of the piston to be closed completely. At the end of the operation of the cylinder, the normally open valves are opened after a lapse of another waiting time long enough for the normally closed valve to be closed completely.

11 Claims, 4 Drawing Sheets

METHOD OF CONTROLLING SOLENOID VALVES FOR A HYDRAULIC ACTUATOR, WITH A TIME DELAY BETWEEN CLOSING A NORMALLY OPEN VALVE AND OPENING A NORMALLY CLOSED VALVE

FIELD OF THE INVENTION

The present invention relates to a method of controlling a hydraulic actuator and, more particularly, to a method of controlling a hydraulic actuator by using a normally closed solenoid valve and normally open solenoid valves and selectively actuating them for providing positioning control.

BACKGROUND OF THE INVENTION

Hydraulic actuators are often used as positioning means for various devices and apparatuses. An example of hydraulic actuator is disclosed in Japanese Patent Laid-Open No. 303,247/1988, where an automotive automatic transmission uses the hydraulic actuator to select a desired gear ratio. In this known construction, mechanical positional output from the actuator is transmitted to the shift lever drive device via a rod and other components to select a desired gear.

Such a positioning hydraulic actuator is shown in FIG. 5 and generally comprises a differential hydraulic cylinder 1 and a hydraulic circuit 3 supplying hydraulic pressure from a hydraulic pressure generator 2 to the cylinder 1. The hydraulic cylinder 1 forms a pressure-receiving chamber 1b having a smaller pressure-receiving area and another pressure-receiving chamber 1a having a larger pressure-receiving area. The chambers 1a and 1b are located on the opposite sides of a piston 10. A normally closed solenoid valve $V_1$ is connected with the chamber 1b. A normally open solenoid valve $V_2$ is located between the chambers 1b and 1a. A normally open solenoid valve $V_3$ is disposed between the chamber 1a and a tank port T. These three valves $V_1$, $V_2$, $V_3$ are controlled by electrical signals. The speed of the cylinder is controlled by energizing and deenergizing the intermediate valve $V_2$ or controlling the duty cycle of the pulses applied to this valve.

When the piston rod 11 is moved to the right as indicated by the arrow in FIG. 5, the hydraulic actuator has been heretofore controlled in the manner described now. When the piston 10 is started, the normally closed solenoid valve $V_1$ and the normally open solenoid valve $V_3$ are simultaneously actuated, as shown in FIG. 6, to shut off the fluid passage from the tank T. The oil under pressure from the hydraulic pressure generator 2 flows into the pressure-receiving chambers 1a and 1b on the opposite sides of the piston 10 through the port in the opened valve $V_1$ and through the port in the normally open valve $V_2$. The difference in pressure between the two chambers initiates the operation of the piston 10.

When a given stop start position located ahead of an intended stop position is reached, the intermediate, normally open valve $V_2$ is actuated to increase the pressure in the chamber 1b. This decelerates the movement of the piston 10. When the piston rod 11 reaches the intended stop position and the operation is complete, all the solenoid valves $V_1$, $V_2$, and $V_3$ are deenergized at the same time to shut off the oil passage.

When the hydraulic actuator is controlled in this way, it is inevitable that considerable large pressure surges are produced in the circuit because of the difference in characteristic between the normally open valve and the normally closed valve. Specifically, when the valve body of a normally closed solenoid valve is shifted out of its closed position, if the port or passage opens at all, the oil under pressure is released and gushes out. Therefore, the normally closed solenoid valve responds very quickly. On the other hand, a normally open solenoid valve is closed after it is open, the valve body closes the port so as to obstruct the flow of the circulating oil under pressure. Therefore, it takes long to completely close the port after the valve is started to be closed, i.e., the valve responds slowly.

For this reason, if the normally closed solenoid valve $V_1$ and the normally open solenoid valve $V_3$ are simultaneously actuated in a straightforward manner at the beginning of the operation of the hydraulic cylinder 1 as described above, then a pressure surge will take place at the instant indicated by "A" on the left side in FIG. 6 because of the response delay of the normally open solenoid valve $V_3$. Also, when the operation of the hydraulic cylinder 1 ends, all the solenoid valves are deenergized simultaneously and so a pressure surge is produced as indicated by "B" on the right side in FIG. 6 also because of the response delay of the normally closed solenoid valve $V_1$.

As is well known in the art, such a pressure surge is created by transformation of the kinetic energy of oil into elastic energy and acts as an oil hammer. Accordingly, if the hydraulic pressure generator 2 is equipped with an accumulator 20 to store the produced hydraulic pressure, and if a motor is started and stopped with a high-pressure switch PSW2 and a low-pressure switch PSW1 to drive a pump, then these switches may malfunction.

In particular, the aforementioned pressure surge stimulates the pressure switches PSW1 and PSW2 to change into other state at a pressure lower than the pressure at which the switch PSW1 is to be switched to other state and at a pressure higher than the pressure at which the switch PSW2 is to be switched to other state, respectively. Therefore, the switches PSW1 and PSW2 are actuated much more frequently. This increases the frequency at which the motor for the pump is actuated. As a result, it is inevitable that the pressure switches PSW1, PSW2, and the motor for the pump age prematurely.

SUMMARY OF THE INVENTION

The present invention has been made to solve the foregoing problems.

It is an object of the present invention to provide a method of controlling a hydraulic actuator, using a normally closed solenoid valve and a plurality of normally open solenoid valves without producing pressure surges which would have posed problems when the hydraulic actuator performed a positioning operation to thereby prevent pressure switches from malfunctioning, whereby preventing the switches and a motor from aging prematurely.

The above object is achieved in accordance with the teachings of the present invention by a method of controlling the operation of a hydraulic actuator including a hydraulic cylinder, a hydraulic pressure generator supplying hydraulic pressure to the cylinder, a normally closed solenoid valve, and two normally open solenoid valves in such a way that, when the operation of the cylinder is started, the normally closed solenoid valve located in the fluid passage connecting the hydraulic pressure generator to the hydraulic cylinder and on the side of the hydraulic pressure generator is opened after a lapse of a waiting time long enough for that of the normally open solenoid valves which corresponds to the direction of movement of the piston of the cylinder to be closed completely and that, when the operation of the cylinder ends, the normally open valves connected in series downstream of the normally closed valve are opened after a lapse of a waiting time long enough for the normally closed valve to be closed completely, the hydraulic actuator being adapted to actuate the solenoid valves in an interrelated manner to force oil into the cylinder, for moving the piston right or left from its neutral position.

In this method, when the hydraulic cylinder is started, the normally closed solenoid valve is not immediately actuated. Rather, this valve is actuated after the given waiting time elapses. This assures that the quick-response normally closed valve is opened to introduce pressure oil after the normally open valves are fully closed to establish the used fluid passage. As a result, the oil under pressure flows quite smoothly. Hence, abrupt and abnormal variations in the pressure are suppressed.

When the operation of the cylinder ends after the piston rod reaches the intended stop position, the normally open solenoid valves are not immediately deenergized. Rather, the normally closed solenoid valve is first deenergized and the given waiting time is allowed to pass. This assures that the flow of oil forced out of the hydraulic pressure generator is gradually reduced and entirely stopped. Since the normally open valves are not opened before the flow of the oil under pressure is stopped, abrupt and abnormal variations in the pressure are suppressed. Therefore, pressure surges which present problems when this kind of hydraulic actuator is used can be reduced. This prevents the pressure switches from malfunctioning, thus preventing the expensive pressure switches and motor from aging prematurely.

In the best aspect of the invention, the hydraulic pressure generator includes a pump, an accumulator storing the oil forced out of the pump, and two pressure switches for turning on and off, respectively, the motor driving the pump. The pressure switches actuate at a low pressure and at a high pressure, respectively. The hydraulic cylinder has two pressure-receiving chambers on the opposite sides of the piston. One of the chambers has a larger pressure-receiving area, while the other has a smaller pressure-receiving area. One of the chambers is connected to the hydraulic pressure generator via a normally closed first solenoid valve, whereas the other is connected to a tank via a normally open third solenoid valve. The two chambers are connected to each other via a normally open second solenoid valve.

In one feature of the invention, the normally closed first solenoid valve and the normally open second and third solenoid valves are actuated by their respective driver circuits which are electrically connected with a central processing unit (CPU). This CPU receives the output signal from a piston rod stroke sensor, the output signal from a stop position setter, and the output signal from a time base generator circuit. The stop position setter delivers a signal indicating the intended stop position of the piston rod. The time base generator circuit delivers a clock signal. In addition, a pressure surge-reducing clock circuit sets waiting times for starting and ending the operation and applies signals indicating these waiting times to the CPU. The CPU controls the timing at which the driver circuits deliver driving signals, according to the signals indicative of the waiting times. The pressure surge-reducing clock circuit is incorporated as hardware in the time base generator circuit or takes the form of software loaded in the CPU.

Other objects and features of the invention will appear in the course of the description thereof which follows.

DETAILED DESCRIPTION OF THE PREFERRED EMBODIMENTS

Figure 1:
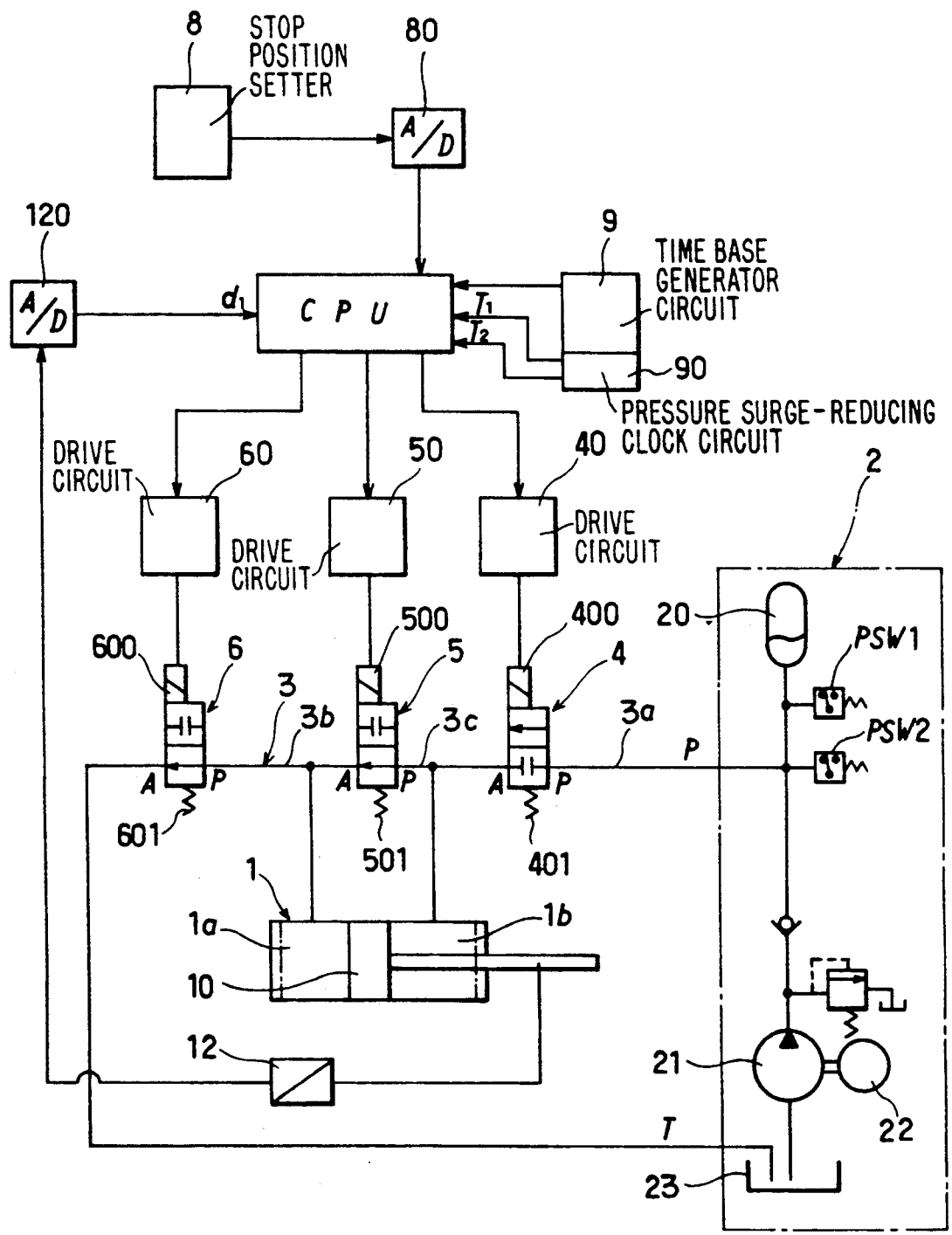
FIG. 1 is a schematic block diagram of a hydraulic actuator which is controlled in accordance with the present invention.

Referring to FIG. 1, there is shown a hydraulic actuator and a control system exerting control over the actuator in accordance with the present invention. The actuator includes a hydraulic cylinder 1, such as a differential hydraulic cylinder. A piston 10 is slidably mounted in the bore formed in the body of the cylinder 1. The piston 10 has a piston rod 11 coupled to the right side of the piston. The rod 11 terminates in a driven means (not shown). A stroke sensor 12 is mounted at one end of the stroke of the piston rod 11 to detect the movement of the piston 10. Of course, the stroke may also be sensed by a dedicated thin sensor rod mounted on the opposite side of the piston rod. The stroke sensor 12 can have the known construction and transforms a position change into a resistance change or a voltage change.

A pressure-receiving chamber 1a having a larger pressure-receiving area is formed on the left of the piston 10 inside the body of the cylinder. A second pressure-receiving chamber 1b having a smaller pressure-receiving area is formed on the right of the piston 10 inside the body of the cylinder.

The hydraulic actuator further includes a hydraulic pressure generator 2. This pressure generator 2 includes a pump 21 driven by a motor 22, an accumulator 20 storing the oil forced out of the pump 21, a pressure switch PSW1 actuating at a high pressure, another pressure switch PSW2 actuating at a low pressure, and a tank 23. The switch PSW2 acts to start the motor 22. When this switch PSW2 actuates, the pump 21 operates to force oil into the accumulator 20. The switch PSW1 serves to stop the operation of the motor.

The hydraulic pressure generator 2 has a pump port P and a tank port T. A hydraulic circuit 3 connects together these ports P and T. The hydraulic circuit 3 has a passage 3a connecting the pump port P with the pressure-receiving chamber 1b having the smaller pressure-receiving area, a passage 3b connecting the pressure-receiving chamber 1a having the larger pressure-receiving area with the tank port T, and a passage 3c connecting the passage 3a with the passage 3b.

A first solenoid valve 4 which is normally closed is located on the most upstream side in the hydraulic circuit 3, i.e., placed in the passage 3a connecting the pump port P with the pressure-receiving chamber 1b having the smaller pressure-receiving area. A second solenoid valve 5 that is normally open is mounted in the passage 3c connecting the passage 3b with the passage 3a.

A third solenoid valve 6 which is normally open is installed on the most downstream side, i.e., positioned in the passage 3b connecting the pressure-receiving chamber 1a having the larger pressure-receiving area with the tank port T.

In this example, the solenoid valves 4, 5, and 6 are each a known valve which can be opened and closed by being switched between two states. The valves 4–6 have solenoid coils 400, 500, 600 at their respective one ends and return springs 401, 501, 601, respectively, at their opposite ends. Of course, the second valve 5 and the third valve 6 can be known servo valves which are controlled by exerting control over the duty cycle of the input pulses.

The solenoid coils 400, 500, 600 of the solenoid valves 4, 5, 6 are connected with driver circuits 40, 50, 60, respectively. When the solenoid coil 400 of the first valve 4 is energized by the driver circuit 40, the valve 4 is opened to connect its port P with its port A. When the coil 400 is not energized as shown in FIG. 1, the port P is disconnected from the port A. When the solenoid coil 50 of the second valve 5 is not energized, its port P is connected with its port A to open the valve. When the coil 50 is energized, the port P is disconnected from the port A. The third solenoid valve 6 functions similarly to the second valve 5.

The driver circuits 40, 50, 60 are selectively operated by the driving signal produced from the CPU consisting of a microcomputer. The aforementioned stroke sensor 12 is electrically connected with the CPU via an analog-to-digital converter 120. The output signal from the stroke sensor 12 indicates the position of the piston rod 11 and is converted into digital form $d_1$ by the A/D converter 120 before application to the CPU. A stop position setter 8 is also connected with the CPU via an analog-to-digital converter 80. A voltage of a level corresponding to an intended stop position is supplied from the position setter 8 to the CPU via the A/D converter 80. The position setter 8 includes a DC voltage source and a variable resistor.

Also connected with the CPU is a time base generator circuit 9 which applies a clock signal indicating time intervals to the CPU. The CPU performs an arithmetic operation according to the clock signal to bring the piston rod 11 to a stop at a given stop position. A pressure surge-reducing clock circuit 90 is ancillary to the time base generator circuit 9.

At the beginning of the operation of the piston, the first solenoid valve 4 is actuated when a waiting time $T_1$ elapses since the second solenoid valve 5 or the third solenoid valve 6 is actuated. At the end of the operation of the piston, the second valve 5 and the third valve 6 are deenergized when a waiting time $T_2$ elapses since the first valve 4 is deenergized. The pressure surge-reducing clock circuit 90 sets the waiting times $T_1$ and $T_2$ and informs the CPU of these waiting times. Then, the CPU adjusts the timing at which driving signals are sent to the driver circuits 40, 50, 60, using timers or the like.

The waiting time $T_1$ is set by empirically finding or actually measuring the delay of the response of the second valve 5 or the third valve 6 when it is actuated. Similarly, the waiting time $T_2$ is set by empirically finding or actually measuring the delay of the response of the first valve 4 when it is deenergized.

Usually, the piston 10 of the hydraulic cylinder 1 is in its neutral position shown in FIG. 1. In this state, the first valve 4 is closed but the second and third valves 5 and 6 are open.

In order to move the piston 10 from this position, the CPU delivers adequate driving signals to the driver circuits 40, 50, and 60 to selectively actuate the three solenoid valves 4, 5, 6. Thus, the flow of oil forced out of or into the hydraulic pressure generator 2 is controlled. The hydraulic pressure is transformed into a thrust pushing the piston 10. The intended stop position of the piston is indicated by the broken line in the hydraulic cylinder 1 in FIG. 1. A signal indicating this stop position is supplied from the stop position setter 8 to the CPU via the A/D converter 80.

Figure 2:
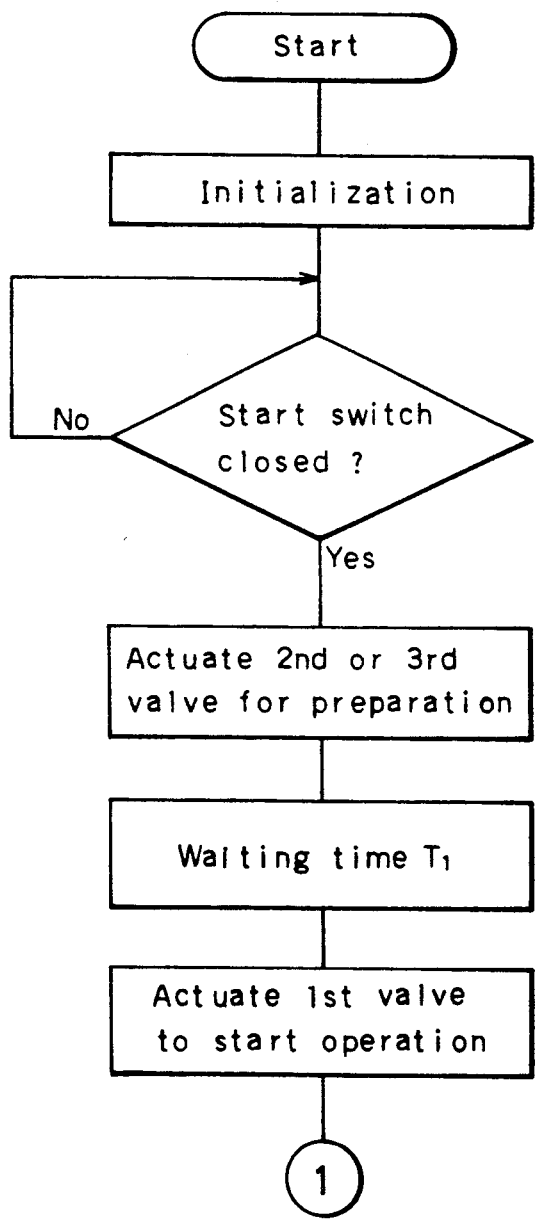
FIG. 2 is a flowchart illustrating a series of operations performed at the beginning of the operation of the actuator shown in FIG. 1.
Figure 3:
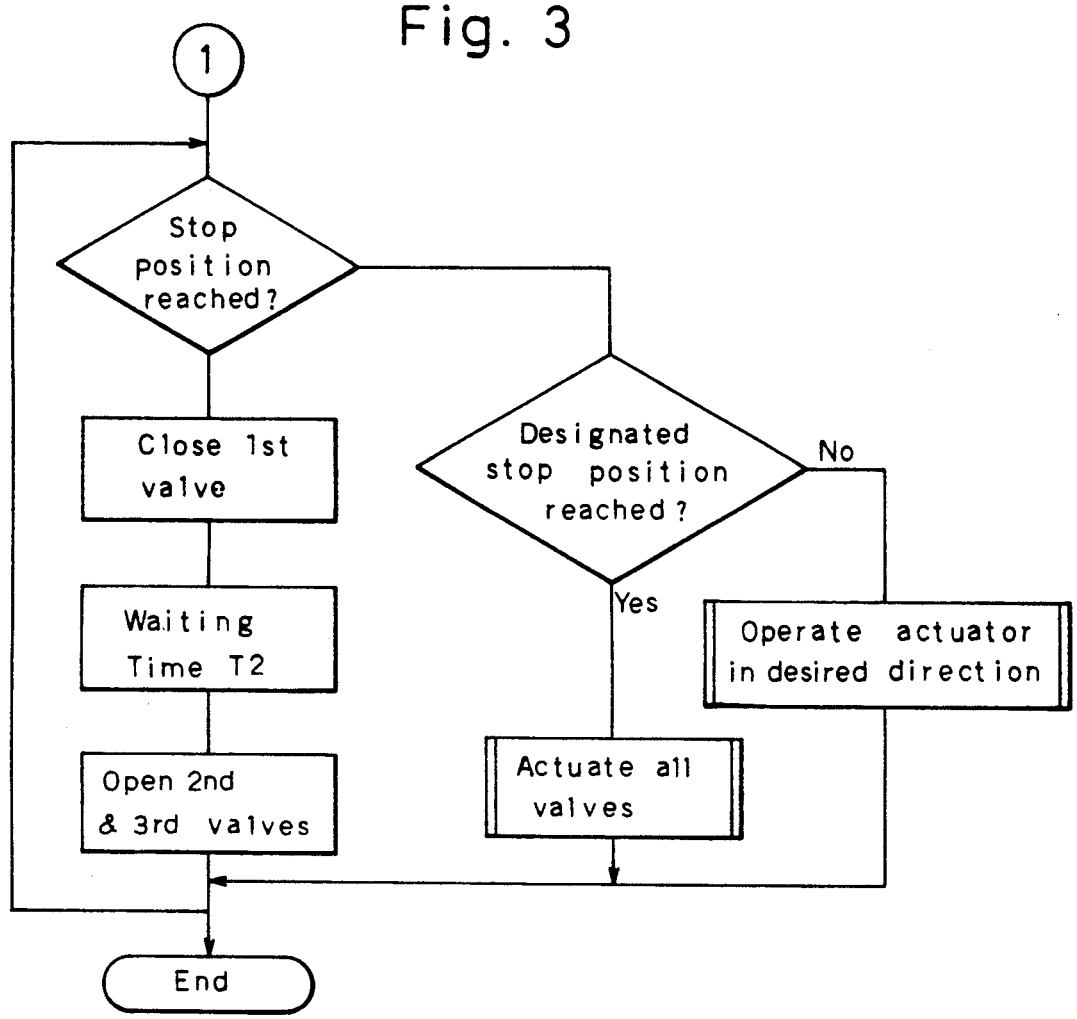
FIG. 3 is a flowchart illustrating a series of operations performed at the end of the operation of the actuator shown in FIG. 1.
Figure 4:
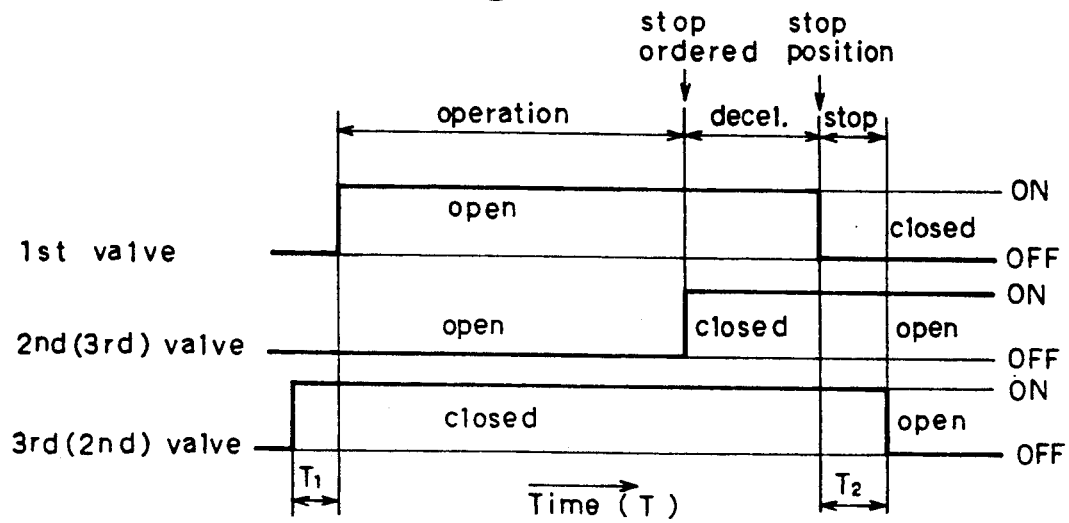
FIG. 4 is a time chart illustrating the operations of the solenoid valves shown in FIG. 1.
Figure 5:
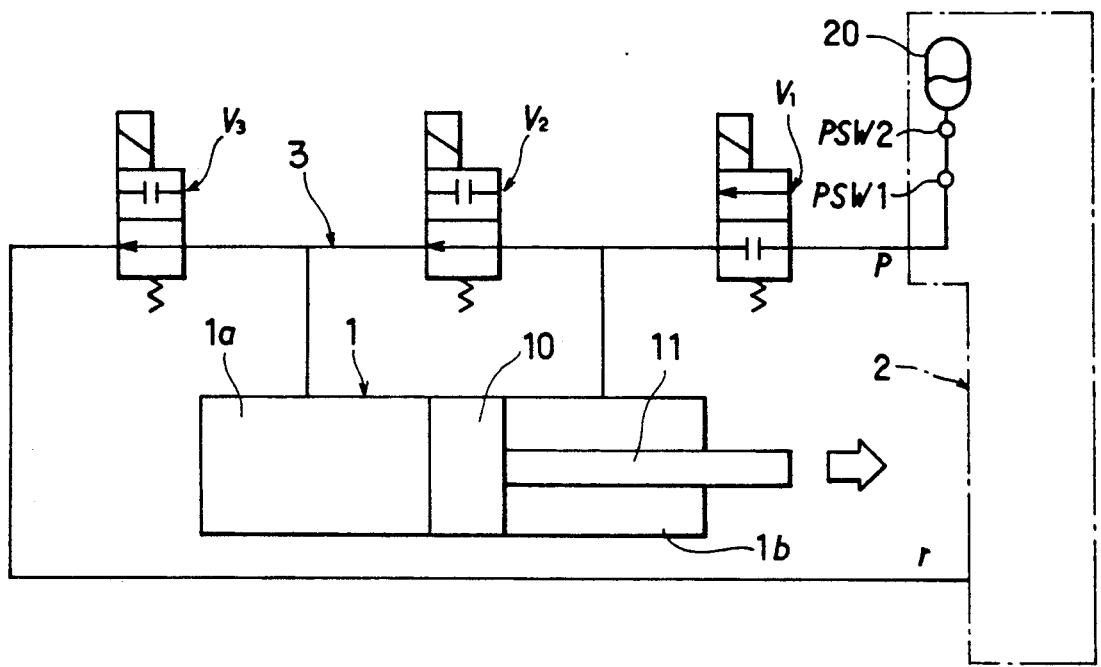
FIG. 5 is a schematic of the prior art hydraulic actuator.
Figure 6:
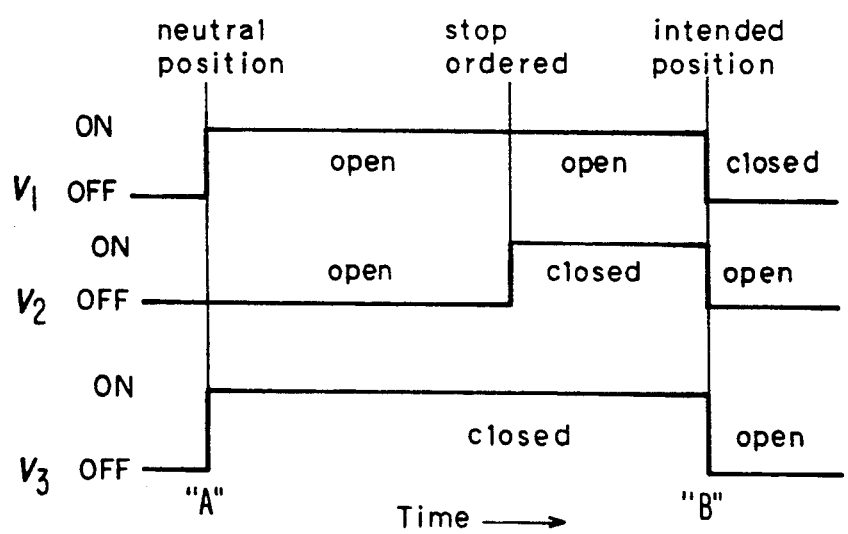
FIG. 6 is a time chart illustrating the operations of the solenoid valves shown in FIG. 5, and in which the valves are controlled by the prior art techniques.

FIG. 2 is a flowchart illustrating a set of operations performed to control the solenoid valves at the beginning of the operation of the hydraulic cylinder. FIG. 3 is a flowchart illustrating a set of operations performed to control the solenoid valves at the end of the operation of the cylinder. FIG. 4 illustrates the operations of these solenoid valves.

At the beginning of the operation of the hydraulic cylinder, the solenoid valves are initialized. At this time, the pressure surge-reducing clock circuit 90 informs the CPU of the waiting times $T_1$ and $T_2$, and these times are stored in the software loaded in the CPU. A check is made to see whether the present condition is in the condition shown in FIG. 1. Thereafter, a check is made to determine whether a switch for starting the operation is closed. If the piston is to be moved to the right as viewed in FIG. 1, then the CPU causes the driver circuit 60 to energize the solenoid coil 600, for actuating the third solenoid valve 6. If the piston is to be shifted to the left, the CPU instructs the driver circuit 50 to energize the solenoid coil 500, for actuating the second valve 5. At this time, the signal indicating the previously entered waiting time $T_1$ disables the CPU, so that the driver circuit 40 is prevented from operating. The first solenoid valve 4 which is normally closed is maintained inactive. Therefore, the pressure oil from the hydraulic pressure generator 2 flows into none of the pressure-receiving chambers 1a and 1b. Hence, it substantially follows that either the second valve 5 or the third valve 6 is in standby condition even if it is actuated.

When this process ends and the waiting time $T_1$ entered as described above elapses, the driver circuit 40 is no longer disabled to energize the solenoid coil 400, thus actuating the first valve 4. The waiting time $T_1$ is the response time of the second valve 5 or the third valve 6 under unloaded condition. Then, the oil is started to be forced from the hydraulic pressure generator 2 into the passage 3b. If the piston 10 is to be moved to the right, the pressure oil flows into the pressure-receiving chamber 1a through the passages 3a, 3c, 3b in this order, since the third valve 6 has been already actuated to prevent the oil from flowing into the tank. Then, the oil passes into the pressure-receiving chamber 1b from the passage 3b. The difference in pressure-receiving area between the chambers 1a and 1b starts to move the piston 10 to the right.

At the above-described beginning of the operation, the waiting time $T_1$ assures that the normally open solenoid valves are completely closed. The normally closed valve showing quick response is not opened before the utilized fluid passage is established. Then, the oil under pressure is introduced. Therefore, the oil flows quite smoothly. In consequence, abrupt and abnormal variations in the pressure are suppressed.

After the operation is started as described above, the stroke sensor 12 constantly delivers a signal indicating the position of the piston to the CPU, which calculates the difference between this signal and the signal indicative of the intended stop position. When it is found that the preset stop position is reached, the CPU orders the driver circuit 50 or 60 to actuate the second solenoid valve 5 or the third solenoid valve 6, depending on whether the piston should be moved left or right, respectively. In this way, the fluid passage is shut off. The pressure oil then flows into the pressure-receiving chamber which is being narrowed by the moving piston. As a result, the piston 10 decelerates and arrives at the stop position.

The above-described process ending with the end of the operation is illustrated in FIG. 3. First, a decision is made to ascertain whether the piston has arrived at the stop position. For this purpose, the difference between the output signal from the stroke sensor 12 and the output signal from the stop position setter 8 is read. If the specified stop position is reached, all the solenoid valves 4, 5, 6 are actuated. If not so, the valves 4–6 are selectively actuated in such a way that the piston is moved.

If the result of the decision is that the stop position has been reached, then the first step is carried out. That is, the CPU instructs the driver circuit 40 to deenergize the solenoid coil 400, thus closing the first solenoid valve 4. During the above-described waiting time $T_2$, i.e., the response time of the first valve 4 under loaded condition, the second valve 5 and the third valve 6 are kept actuated. When the waiting time $T_2$ elapses, the CPU signals the driver circuits 50 and 60 to deenergize the solenoid coils 500 and 600, thus opening the second valve 5 and the third valve 6.

Also in this case, in order to previously close the first solenoid valve 4, a sufficient time to gradually reduce the flow of the pressure oil from the hydraulic pressure generator 2 and to completely shut off the fluid passage is secured. In this way, the normally open solenoid valves are not opened until the flow of the pressure oil is stopped. Consequently, abrupt and abnormal variations in the pressure are suppressed.

It is to be noted that the foregoing constitutes merely one example of the invention. The pressure surge-reducing clock circuit 90 acting to actuate the solenoid valves after the waiting times $T_1$ and $T_2$ elapse may, of course, take the form of software loaded in the CPU itself. Although the invention is preferably applied to a hydraulic actuator for selecting a desired gear of an automative automatic transmission, the invention can find other applications.

What is claimed is:

1. A method of controlling the operation of a hydraulic actuator including a hydraulic cylinder having a piston, said piston having a piston rod; a hydraulic pressure generator supplying hydraulic pressure to said hydraulic cylinder by means of a fluid passage in communication with said hydraulic cylinder and said hydraulic pressure generator; a normally closed solenoid valve in said fluid passage and on the side of said hydraulic pressure generator; and first and second normally open solenoid valves connected in series downstream of said normally closed solenoid valve; said method comprising:
   when the operation of said hydraulic cylinder is started, opening said normally closed solenoid valve after the lapse of a waiting time $T_1$, such that $T_1$ is long enough for said first or second normally open solenoid valve, depending upon the position of said piston, to be closed completely; and
   when the operation of said hydraulic cylinder is terminated, opening said first and second normally opened solenoid valves after the lapse of a waiting time $T_2$, such that $T_2$ is long enough for said normally closed solenoid valve to be closed completely.

2. The method of claim 1, wherein said hydraulic pressure generator comprises a tank, a pump, an accumulator storing oil forced out of said pump, a pressure switch actuating at a lower pressure and acting to switch on a motor driving said pump, and another pressure switch actuating at a higher pressure and acting to switch off said motor; and wherein said hydraulic cylinder has a first pressure-receiving chamber having a larger pressure-receiving area and a second pressure-receiving chamber having a smaller pressure-receiving area, the chambers being located on opposite sides of said piston in said cylinder, said second pressure-receiving chamber being connected with said hydraulic pressure generator via said normally closed solenoid vlave, said first pressure-receiving chamber being connected with said tank in said hydraulic pressure generator via said first normally open solenoid valve, and said first pressure-receiving chamber and said second pressure-receiving chamber being connected to each other via said second normally open solenoid valve.

3. The method of claim 1 or 2, wherein said normally closed solenoid valve is driven by a first driver circuit, said first normally open solenoid valve is driven by a second driver circuit, and said second normally open solenoid valve is driven by a third driver circuit, said first, second and third driver circuits being electrically connected with a central processing unit; said central processing unit receiving signals from a piston rod stroke sensor from a stop position setter delivering a signal indicating an intended stop position of said piston rod of said cylinder, and from a time base generator circuit delivering a clock signal; said method further comprising:
   setting said waiting times $T_1$ and $T_2$ with a pressure surge-reducing clock circuit;
   informing said central processing unit of said times $T_1$ and $T_2$ that control the timing at which driving signals are delivered from said driver circuits;
   controlling said normally closed solenoid valve and said first and second normally open solenoid valves at the beginning of the operation of said hydraulic cylinder, by performing the steps of:
      storing said waiting times $T_1$ and $T_2$ set by said pressure surge-reducing clock circuit in said central processing unit;
      checking whether said piston is in its neutral position;
      causing said second driver circuit to actuate said first normally open solenoid valve or said third driver circuit to actuate said second normally open solenoid valve, depending on the position of said piston, while maintaining said normally closed solenoid valve deenergized; and causing said first driver circuit to actuate said normally closed solenoid valve after a lapse of the previously set waiting time $T_1$.

4. The method of claim 3, wherein said pressure surge-reducing clock circuit comprises software loaded in said central processing unit.

5. The method of claim 3, wherein said hydraulic actuator acts to select a desired gear ratio of an automotive automatic transmission.

6. The method of claim 1 or 2, wherein said normally closed solenoid valve is driven by a first driver circuit, said first normally open solenoid valve is driven by a second driver circuit, and said second normally open solenoid valve is driven by a third driver circuit, said first, second and third driver circuits being electrically connected with a central processing unit; said central processing unit receiving signals from a piston rod stroke sensor, from a stop position setter delivering a signal indicating an intended stop position of said piston rod of said cylinder, and from a time base generator circuit delivering a clock signal; said method further comprising:

setting said waiting times $T_1$ and $T_2$ with a pressure surge-reducing clock circuit;

informing said central processing unit of said times $T_1$ and $T_2$ that control the timing at which driving signals are delivered from said driver circuits;

controlling said normally closed solenoid valve and said first and second normally open solenoid valves at the end of the operation of said hydraulic cylinder, by performing the steps of:

causing said first driver circuit to deenergize said normally closed solenoid valve while maintaining one of said first and said second normally open solenoid valves energized after the output signal from said piston rod stroke sensor and the output signal from said stop position setter indicate that said piston rod has reached its stop position; and causing said second and third driver circuits to deenergize said first and second normally open solenoid valves after a lapse of the previously set waiting time $T_2$.

7. The method of claim 6, wherein said pressure surge-reducing clock circuit comprises software loaded in said central processing unit.

8. The method of claim 6, wherein said hydraulic actuator acts to select a desired gear ratio of an automotive automatic transmission.

9. The method of claim 1 or 2, wherein said pressure surge-reducing clock circuit comprises software loaded in said central processing unit.

10. The method of claim 9, wherein said hydraulic actuator acts to select a desired gear ratio of an automotive automatic transmission.

11. The method of claim 1 or 2, wherein said hydraulic actuator acts to select a desired gear ratio of an automotive automatic transmission.

* * * * *